O. S. GAUCH & S. D. INSCHO.
TRIPLICATE ORDER OR SALES BOOK.
APPLICATION FILED JAN. 31, 1913.

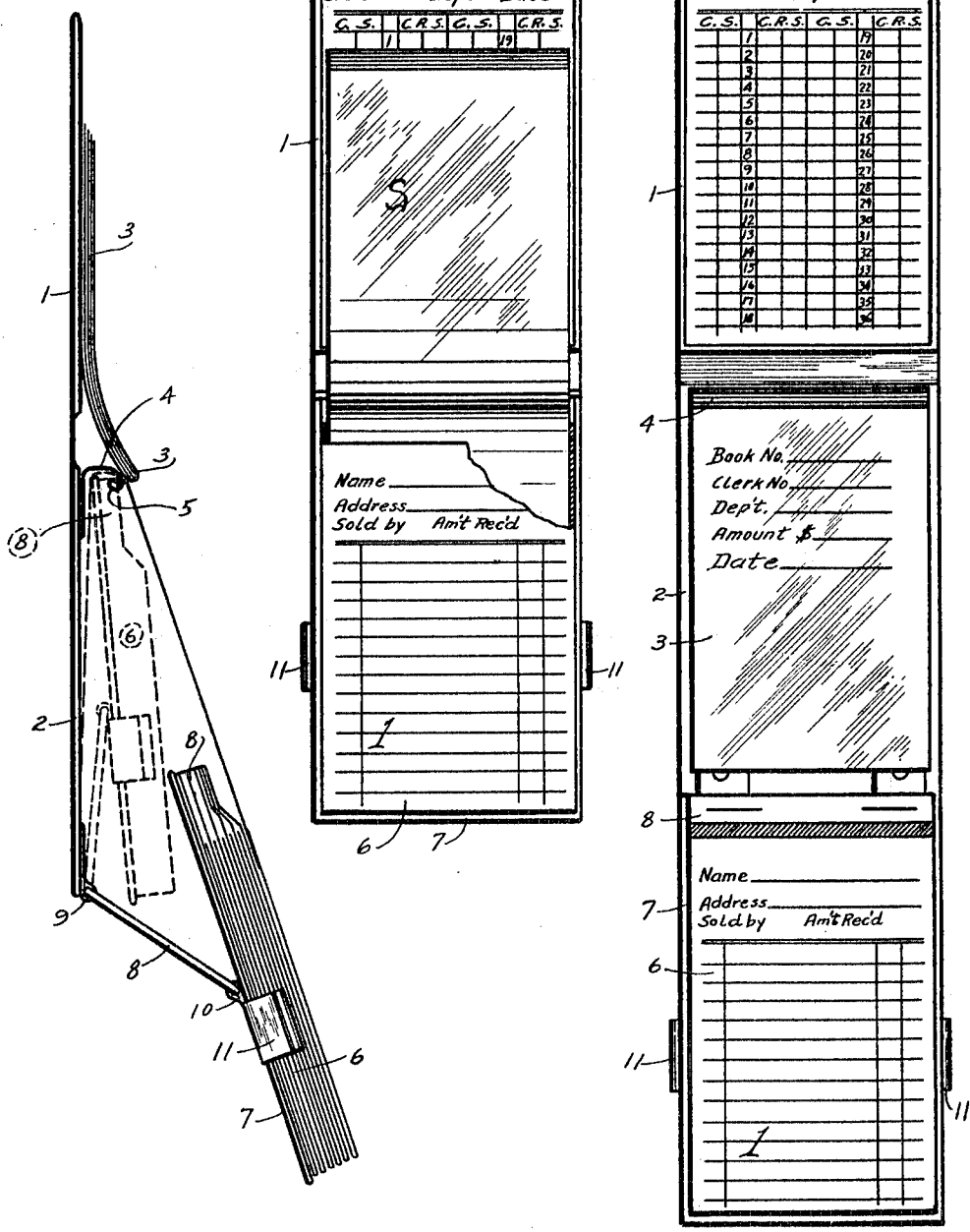

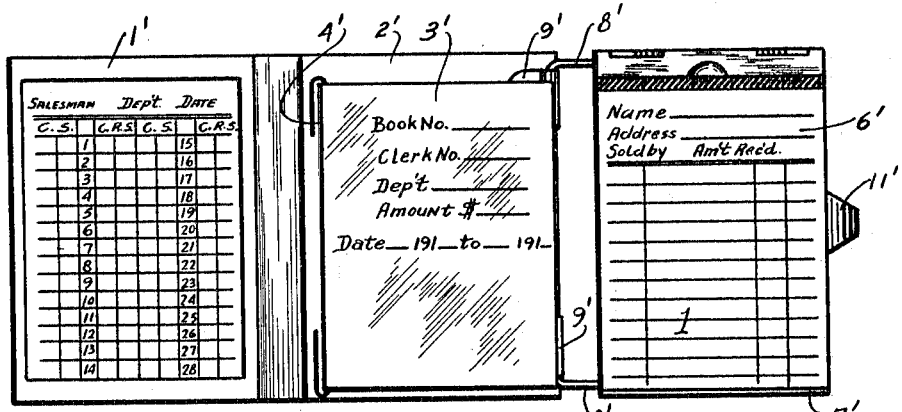
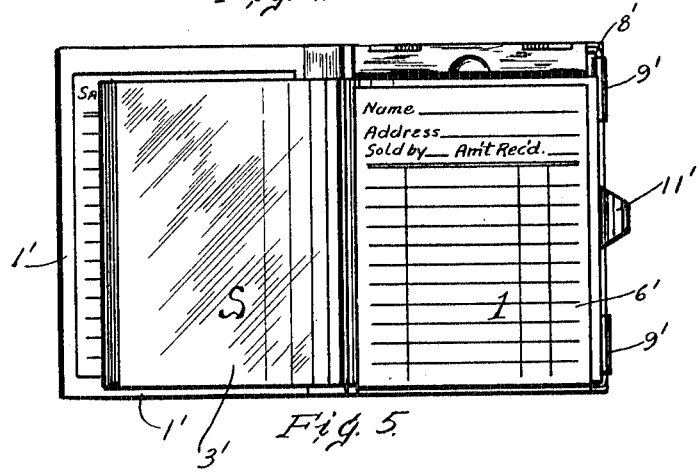
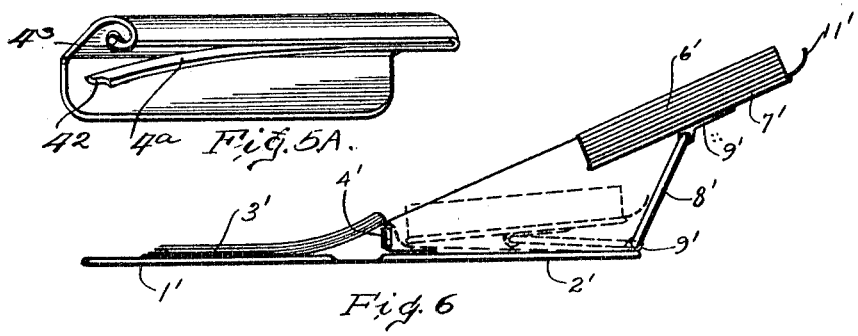

1,115,064.

Patented Oct. 27, 1914.
5 SHEETS—SHEET 3.

Witnesses
Pearl M. Yuncker.
Elizabeth Zipp.

Inventors
Orlando S. Gauch
and
Sidney D. Inscho
By John H. Boss
their Attorney

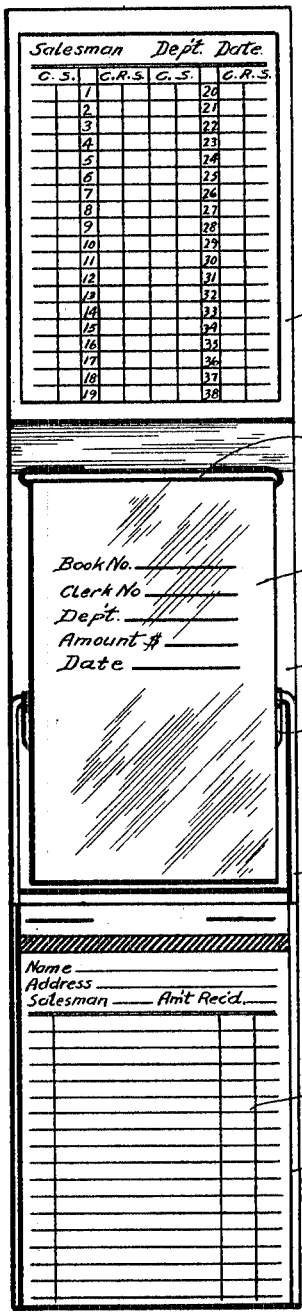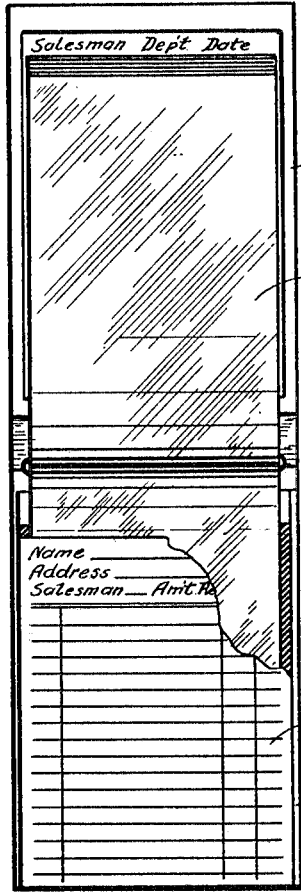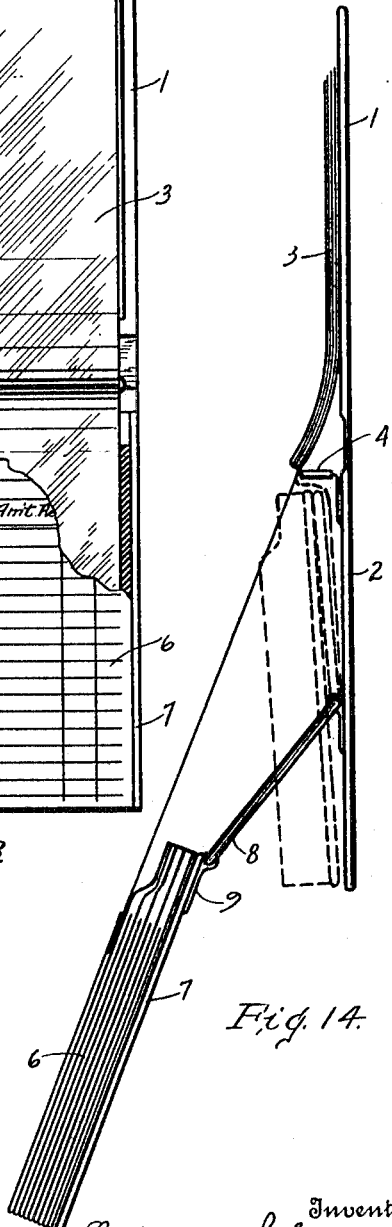

O. S. GAUCH & S. D. INSCHO.
TRIPLICATE ORDER OR SALES BOOK.
APPLICATION FILED JAN. 31, 1913.
1,115,064.
Patented Oct. 27, 1914.
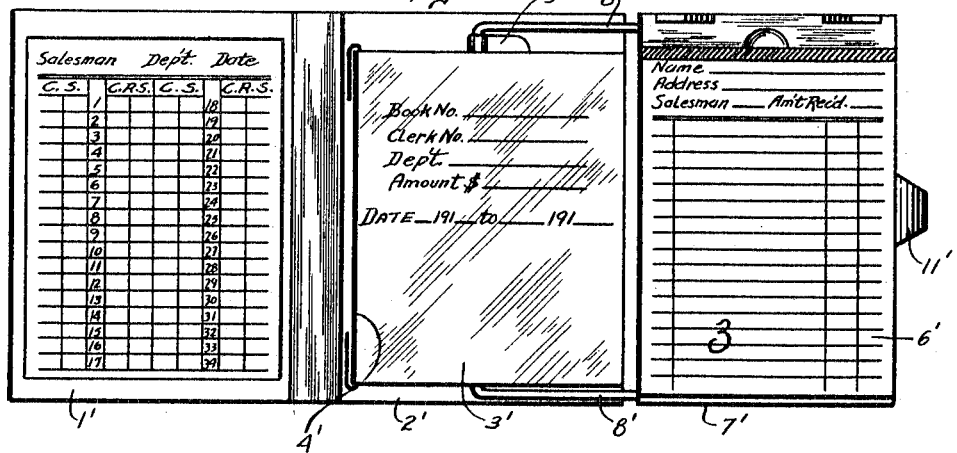
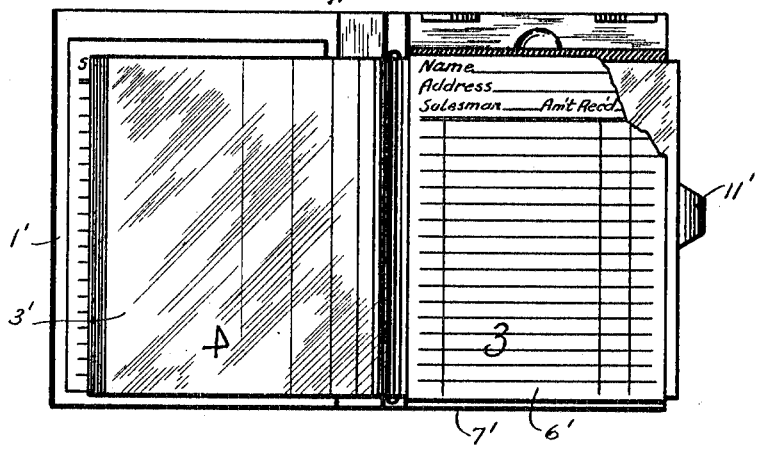
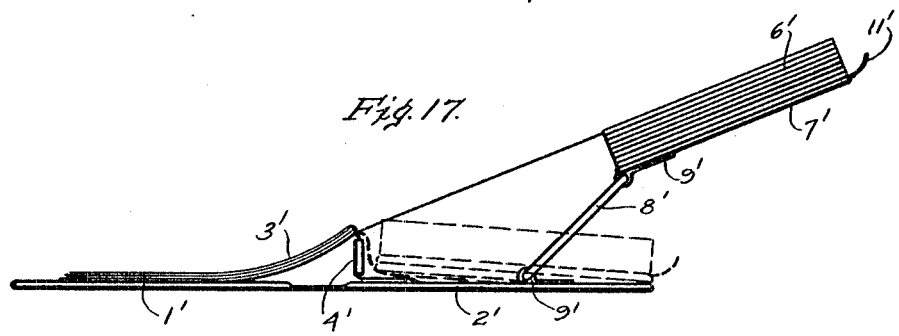

UNITED STATES PATENT OFFICE.

ORLANDO S. GAUCH AND SIDNEY D. INSCHO, OF SHELBY, OHIO, ASSIGNORS TO THE SHELBY PRINTING COMPANY, OF SHELBY, OHIO, A CORPORATION OF OHIO.

TRIPLICATE ORDER OR SALES BOOK.

1,115,064.  Specification of Letters Patent.  Patented Oct. 27, 1914.

Application filed January 31, 1913. Serial No. 745,344.

*To all whom it may concern:*

Be it known that we, ORLANDO S. GAUCH and SIDNEY D. INSCHO, citizens of the United States of America, residing at Shelby, in the county of Richland and State of Ohio, have invented certain new and useful Improvements in Triplicate Order or Sales Books, of which the following is a specification.

This invention relates to certain new and useful improvements in triplicate order or sales books and the object of the invention is to construct a triplicate order or sales book in such a manner that when the duplicating pad, the tissue book and the sales record are placed in position in the cover, all three parts are attached to the same side of the opened cover, and the top surface of each is completely exposed.

Another object is to provide means for removing the tissue leaf from between the original leaf and the carbon sheet of the duplicating pad, after the memoranda has been indorsed thereon, by applying the force used to a point on the auxiliary lid opposite the middle of the binding of the tissue book, which distributes the strain on the leaf equally along its length.

A further object is to so arrange the parts that when the tissue leaf is stripped from the duplicating pad, the strain shall be applied substantially in a straight line and not in a curved line at the upper corner of the inner end of the pad, thus greatly reducing the force necessary to accomplish the stripping operation.

Further objects are to provide means of preventing the bending of the tissue sheet as it is drawn from beneath the original leaf of the pad and at the same time guide and control said tissue sheet as it is being drawn from between the original leaf and carbon sheet preparatory to its dropping on the cover.

Figure 7:
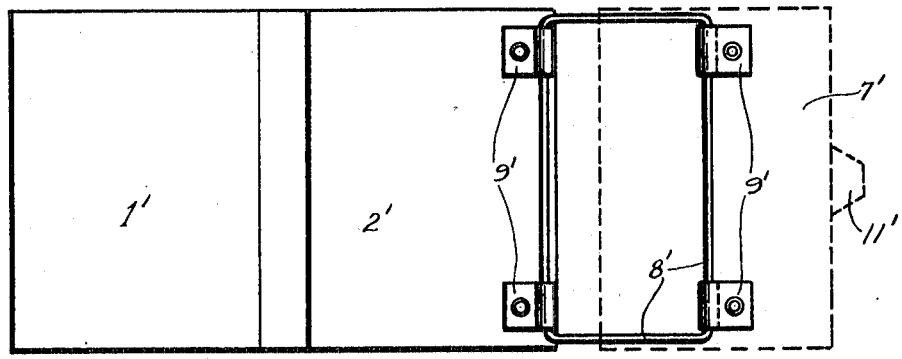
Figure 8:
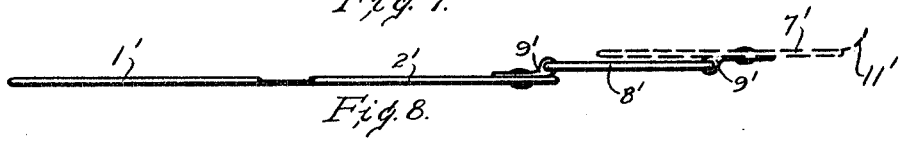
Figure 9:
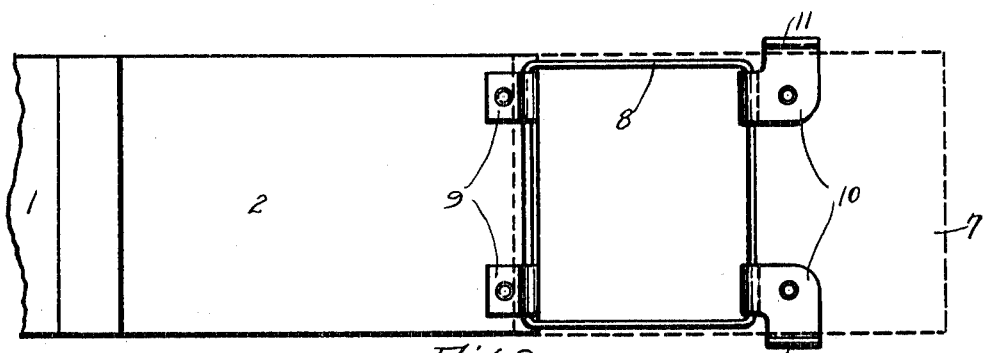
Figure 10:
Figure 11:
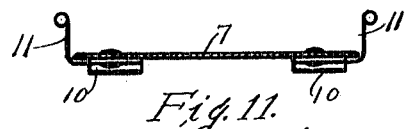

In the drawings Figure 1 is a top plan view of a book constructed in accordance with the present invention, the book being shown with the parts in completely extended or open position. Fig. 2 is a similar view in which the duplicating pad is depicted in normal position. Fig. 3 is a side elevation showing the duplicating pad in the act of stripping a tissue leaf therefrom. Figs. 4, 5 and 6 are views similar to Figs. 1, 2 and 3, respectively of a modified form of the invention. Fig. 5$^A$ is a detail perspective view of a clamp used for holding the tissue book. Fig. 7 is a plan view showing the double acting hinge and its manner of connection with the cover of the book and the back of the duplicating pad. Fig. 8 is a side elevation of Fig. 7. Fig. 9 is a view similar to Fig. 7 of the hinge used in the preferred form of the invention. Fig. 10 is a side elevation of Fig. 9. Fig. 11 is a section on the line X—X of Fig. 10. Figs. 12, 13 and 14 are views of another modified form of our invention showing it applied to an end opening book. Figs. 15, 16 and 17 are similar views to Figs. 12, 13 and 14 showing the modified form applied to a side opening book.

The cover has two parts 1 and 2, a tissue book 3 being secured by means of a clamp 4 to the part 2. The clamp is provided with a flexible tongue 4$^a$ and the cover of the tissue book is mounted thereon. To lock the cover of the tissue book the end 4$^2$ of the clamp is forced to engage the hooked portion 4$^3$ thereof. The clamp 4 is curved over at its upper side so as to provide an overhanging portion 5 for a purpose now to be described. The duplicating pad 6 is attached to a back 7 and its inner end 8, at which end the sheets of the pad 6 are stapled, is preferably formed of such size as to be received under the overhanging upper side 5 of the clamp 4 as depicted in dotted lines in Fig. 3 of the drawings. The back 7 of the pad 6 is movably connected to the part 2 of the cover by means of a double acting hinge which consists of a member 8 preferably, though not necessarily, formed of a substantially rectangular wire frame, and knuckles 9 and 10 which are rigidly secured to the part 2 of the cover and the back 7 of pad 6 respectively, by any suitable fastening means, such as rivets. The ends of the frame are movably embraced by the knuckles, and the knuckles 10 of the back 7 are preferably formed with extensions 11 which project inwardly toward the top of the pad 6 and on opposite sides of the latter and are rolled over at their free sides to form convenient gripping members. The knuckles 9 are attached to the inner face of the part 2 of the cover, while the knuckles 10 are secured to the outer face of the back 7 of pad 6 at points intermediate the length of said back, the parts being so arranged and proportioned that the hinge will, when the pad is closed or in normal position, lie flat between the back 7 and part 2 of the cover.

In operation, one of the tissue leaves of the book 3 is laid on a carbon sheet which is usually attached to the duplicating pad and the original leaf of the pad is then placed on top of the tissue leaf, after which the memoranda is indorsed on the original, and the gripping members engaged with the thumb and one of the fingers of the operator whereupon the latter then raises the outer end of the pad by lifting up on the gripping members 11 until the pad is in a line which is at an incline to the part 2 of the cover, which line is substantially that shown in full lines in Fig. 3 of the drawings, in which it will be noted that the tissue sheet, throughout the stripping operation is held in a straight line throughout its length and width, with the result that the strain to which the tissue sheet is subjected is evenly distributed throughout the same and is not concentrated at any one point, such as might result in tearing the tissue sheet. The aforementioned mode of stripping the tissue sheets also presents the advantage of requiring the expenditure of less force in such operation.

It will also be seen from the above that all of the parts are attached to the same side of the cover. The inner end of the back 7 of the pad 6 engages the stripped tissue sheets, which latter rest upon the side 2 of the cover, and hold the stripped sheets in position, and in addition since the said inner end of the back 7 of the pad 6 engages under the overhanging portion 5 of the clamp 4, said back and pad are thereby held against accidental outward movement, since in order to disengage the back 7 from said portion 5 the back must first be raised up from part 2 of the cover and then moved away from the clamp. In the modified form of the invention shown in Figs. 4, 5 and 6, the latter is applied to a book which opens at its side as distinguished from the end opening book above described.

The cover has two parts 1' and 2', a tissue book 3' secured by a clamp 4', and a pad 6' having a back 7'. In this form of the invention, a finger grip 11' is secured to the back 7' and projects outwardly from the outer side thereof. The double acting hinge is composed of the frame 8', secured by knuckles 9' to the back 7' and to the part 2' of the cover. The operation in the modified form of the invention is substantially the same as in the preferred form.

In the modified forms of books shown in Figs. 12, 13, 14, 15, 16 and 17, the double acting hinge 8' is attached at the end of the back 7' instead of midway thereof. In all other respects the forms are the same in structure and operate in the same manner as forms 1, 2, 3, 4, 5 and 6, the operation and structure of which is described herebefore.

It will be noted that in stripping the tissue leaf from between the original check and the carbon, the used tissue leaf is guided to its proper place on part 2 of the cover by said original leaf.

What is claimed is:

1. In a manifold book, a cover, a tissue book, clamping means to secure the tissue book to the cover, said clamping means having a projecting portion, a pad of original and duplicate leaves, and means to movably connect the pad to the cover so that the inner end of the pad may be moved under and from under said projecting portion of the clamp.

2. In combination with a two-part cover, the parts of which are hingedly connected, a tissue book, means to connect the tissue book to the inner end of one of said parts of the cover, a pad of original and duplicate leaves, means to connect the pad to the opposite end of said part of the cover, and means in connection with said connecting means of the tissue book to engage the inner end of the duplicating pad to hold the latter in normal position.

3. In combination with a two-part cover the parts of which are hingedly connected, a tissue book, means to connect the tissue book to the inner end of one of said parts of the cover, a pad of original and duplicate leaves, knuckles on the upper face and at the outer end of said part of the cover, bearings on the under face of the duplicating pad, and a bail having ends secured to the knuckles of the said cover part and the knuckles of the said duplicating pad, said knuckles of the duplicating pad having parts which extend beyond the sides of the duplicating pad and formed to provide finger grips.

In testimony whereof we affix our signatures in presence of two witnesses.

ORLANDO S. GAUCH.
SIDNEY D. INSCHO.

Witnesses:
J. G. VAN HORN,
M. M. SCALES.

---

Copies of this patent may be obtained for five cents each, by addressing the "Commissioner of Patents, Washington, D. C."